United States Patent
Hong et al.

(10) Patent No.: US 10,429,836 B2
(45) Date of Patent: Oct. 1, 2019

(54) CHANNEL ACCESS METHOD IN UNMANNED AERIAL VEHICLE (UAV) CONTROL AND NON-PAYLOAD COMMUNICATION (CNPC) SYSTEM

(71) Applicant: Electronics and Telecommunications Research Institute, Daejeon (KR)

(72) Inventors: Tae Chul Hong, Seoul (KR); Hee Wook Kim, Daejeon (KR); Kwang Jae Lim, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 102 days.

(21) Appl. No.: 15/609,213

(22) Filed: May 31, 2017

(65) Prior Publication Data

US 2018/0136645 A1    May 17, 2018

(30) Foreign Application Priority Data

Nov. 14, 2016  (KR) .................. 10-2016-0150900
Dec. 21, 2016  (KR) .................. 10-2016-0175379

(51) Int. Cl.
| | |
|---|---|
| G08C 17/00 | (2006.01) |
| G05D 1/00 | (2006.01) |
| H04N 21/2347 | (2011.01) |
| H04W 74/00 | (2009.01) |
| H04W 72/04 | (2009.01) |
| G08C 17/02 | (2006.01) |

(52) U.S. Cl.
CPC ........... *G05D 1/0022* (2013.01); *G08C 17/00* (2013.01); *G08C 17/02* (2013.01); *H04N 21/23476* (2013.01); *H04W 72/0453* (2013.01); *H04W 74/00* (2013.01); *B64C 2201/02* (2013.01); *G08C 2201/50* (2013.01)

(58) Field of Classification Search
None
See application file for complete search history.

(56) References Cited

U.S. PATENT DOCUMENTS

| | | | | |
|---|---|---|---|---|
| 8,750,156 B1 * | 6/2014 | Carbajal | ............... | H04W 24/08 370/252 |
| 8,780,862 B2 * | 7/2014 | Zeng | .................. | H04B 7/18506 370/252 |
| 8,780,968 B1 * | 7/2014 | Garcia | .................. | H04W 24/08 375/228 |
| 8,886,459 B2 * | 11/2014 | Stefani | .................. | G01C 21/00 701/120 |
| 9,274,521 B1 * | 3/2016 | Stefani | ................. | G08G 5/0026 |

(Continued)

FOREIGN PATENT DOCUMENTS

| | | |
|---|---|---|
| KR | 1020110134034 A | 12/2011 |
| KR | 1020160125636 A | 11/2016 |
| WO | 2016140409 A1 | 9/2016 |

*Primary Examiner* — Jonathan M Dager
(74) *Attorney, Agent, or Firm* — Willam Park & Associates Ltd.

(57) ABSTRACT

A channel access method in an unmanned aerial vehicle (UAV) control and non-payload communication (CNPC) system is provided. The channel access method may include setting an uplink frequency and a downlink frequency to each of a ground station and an airborne radio station, and performing, by the ground station and the airborne radio station, an initial access using the uplink frequency or the downlink frequency.

16 Claims, 6 Drawing Sheets

(56) References Cited

U.S. PATENT DOCUMENTS

| | | | |
|---|---|---|---|
| 9,466,219 B1* | 10/2016 | Stefani | G08G 5/0039 |
| 9,497,683 B2 | 11/2016 | Park et al. | |
| 9,529,360 B1* | 12/2016 | Melamed | G01S 3/46 |
| 9,613,536 B1* | 4/2017 | Wolford | G08G 5/003 |
| 9,621,850 B1* | 4/2017 | Mitchell | H04N 7/15 |
| 9,685,087 B2 | 6/2017 | Berckefeldt | G08G 5/0078 |
| 9,946,258 B2* | 4/2018 | kwan | G08G 5/0039 |
| 10,054,941 B1* | 8/2018 | Beard | G08G 5/00 |
| 10,237,770 B2* | 3/2019 | Kleinbeck | H04W 16/14 |
| 2004/0249519 A1* | 12/2004 | Frink | B64D 45/0015 |
| | | | 701/3 |
| 2007/0018052 A1* | 1/2007 | Eriksson | G05D 1/0044 |
| | | | 244/190 |
| 2007/0032246 A1* | 2/2007 | Feher | H04W 64/00 |
| | | | 455/456.1 |
| 2007/0252748 A1* | 11/2007 | Rees | H01Q 1/28 |
| | | | 342/29 |
| 2009/0163221 A1* | 6/2009 | Abedi | H04W 16/10 |
| | | | 455/452.1 |
| 2009/0210109 A1* | 8/2009 | Ravenscroft | G01C 21/005 |
| | | | 701/26 |
| 2010/0066604 A1* | 3/2010 | Limbaugh | G08G 5/0013 |
| | | | 342/357.31 |
| 2010/0085236 A1* | 4/2010 | Franceschini | G01S 13/765 |
| | | | 342/30 |
| 2010/0286859 A1* | 11/2010 | Feigh | G05D 1/0044 |
| | | | 701/25 |
| 2010/0315281 A1* | 12/2010 | Askelson | G01S 7/003 |
| | | | 342/30 |
| 2011/0057830 A1* | 3/2011 | Sampigethaya | G01S 5/0072 |
| | | | 342/36 |
| 2012/0113823 A1* | 5/2012 | Zeng | G08G 5/0013 |
| | | | 370/252 |
| 2012/0143482 A1* | 6/2012 | Goossen | G08G 5/0034 |
| | | | 701/120 |
| 2012/0158280 A1* | 6/2012 | Ravenscroft | G01C 21/005 |
| | | | 701/400 |
| 2012/0265372 A1* | 10/2012 | Hedrick | H04L 67/36 |
| | | | 701/3 |
| 2014/0018979 A1* | 1/2014 | Goossen | G08G 5/0034 |
| | | | 701/3 |
| 2014/0142785 A1* | 5/2014 | Fuentes | G05D 1/0011 |
| | | | 701/2 |
| 2014/0371952 A1* | 12/2014 | Ohtomo | B64C 39/024 |
| | | | 701/2 |
| 2015/0170524 A1* | 6/2015 | Stefani | G08G 5/0013 |
| | | | 701/120 |
| 2015/0254988 A1* | 9/2015 | Wang | G05D 1/0214 |
| | | | 701/3 |
| 2015/0279126 A1* | 10/2015 | Schindler | G08G 5/0013 |
| | | | 701/3 |
| 2015/0301150 A1* | 10/2015 | Stuckman | G01S 1/00 |
| | | | 342/407 |
| 2015/0379874 A1* | 12/2015 | Ubhi | G01S 5/0027 |
| | | | 701/3 |
| 2016/0101855 A1* | 4/2016 | Stefani | G08G 5/0008 |
| | | | 701/2 |
| 2016/0105233 A1* | 4/2016 | Jalali | H04B 7/18504 |
| | | | 342/359 |
| 2016/0117931 A1* | 4/2016 | Chan | G08G 5/0043 |
| | | | 701/120 |
| 2016/0192358 A1 | 6/2016 | Lee et al. | |
| 2016/0225264 A1* | 8/2016 | Taveira | B64C 39/024 |
| 2016/0240087 A1* | 8/2016 | Kube | G08G 5/006 |
| 2016/0245907 A1* | 8/2016 | Parker | F41H 11/02 |
| 2016/0253907 A1* | 9/2016 | Taveira | G08G 5/006 |
| | | | 701/3 |
| 2016/0291589 A1* | 10/2016 | Ashoori | G01S 19/13 |
| 2016/0351057 A1* | 12/2016 | Elmasry | G05D 1/0022 |
| 2016/0370800 A1* | 12/2016 | Chau | G05D 1/0088 |
| 2017/0047983 A1* | 2/2017 | Gouillou | H04B 7/18506 |
| 2017/0057634 A1* | 3/2017 | Hunt | B64C 39/024 |
| 2017/0148332 A1* | 5/2017 | Ziemba | G08G 5/0013 |
| 2017/0183074 A1* | 6/2017 | Hutson | B64C 1/061 |
| 2017/0192421 A1* | 7/2017 | Vega | G05D 1/0022 |
| 2017/0215178 A1* | 7/2017 | Kim | H04W 72/048 |
| 2017/0215220 A1* | 7/2017 | Kim | H04W 16/14 |
| 2017/0234724 A1* | 8/2017 | Naguib | G01H 3/08 |
| | | | 367/117 |
| 2017/0234966 A1* | 8/2017 | Naguib | G01S 5/22 |
| | | | 367/117 |
| 2017/0235316 A1* | 8/2017 | Shattil | B64C 39/024 |
| | | | 701/3 |
| 2017/0255194 A1* | 9/2017 | Poornachandran | B64C 39/024 |
| 2017/0255802 A1* | 9/2017 | Falk | G06K 7/10366 |
| 2017/0270803 A1* | 9/2017 | High | B64C 39/02 |
| 2017/0277176 A1* | 9/2017 | Hutson | G05D 1/0016 |
| 2017/0280411 A1* | 9/2017 | Noonan | H04W 64/00 |
| 2017/0337826 A1* | 11/2017 | Moran | G01S 1/042 |
| 2018/0013193 A1* | 1/2018 | Olsen | H01Q 1/288 |
| 2018/0037320 A1* | 2/2018 | Ko | B64C 39/024 |
| 2018/0046180 A1* | 2/2018 | Falk | G06K 9/00624 |
| 2018/0081355 A1* | 3/2018 | Magy | F41H 13/00 |
| 2018/0139074 A1* | 5/2018 | Hong | H04B 7/185 |
| 2018/0157255 A1* | 6/2018 | Halverson | B64C 39/024 |
| 2018/0160433 A1* | 6/2018 | Kim | H04W 72/082 |
| 2018/0211263 A1* | 7/2018 | Gong | G06F 16/29 |
| 2018/0211547 A1* | 7/2018 | Cui | G08G 5/006 |
| 2018/0217267 A1* | 8/2018 | Lim | H04B 7/18504 |
| 2018/0324881 A1* | 11/2018 | Gagne | G01S 19/41 |
| 2019/0166516 A1* | 5/2019 | Kim | H04W 24/10 |

* cited by examiner

30

500

CHANNEL ACCESS METHOD IN UNMANNED AERIAL VEHICLE (UAV) CONTROL AND NON-PAYLOAD COMMUNICATION (CNPC) SYSTEM

CROSS-REFERENCE TO RELATED APPLICATIONS

This application claims the benefit of Korean Patent Application No. 10-2016-0150900, filed on Nov. 14, 2016, and Korean Patent Application No. 10-2016-0175379, filed on Dec. 21, 2016, in the Korean Intellectual Property Office, the disclosures of which are incorporated herein by reference.

BACKGROUND

1. Field of the Invention

At least one example embodiment relates to a channel access method in an unmanned aerial vehicle (UAV) control and non-payload communication (CNPC) system.

2. Description of the Related Art

All components required for an entire flight process, including a control communication system, for example, takeoff/cruise, flight control, landing/retrieval, and the like, together with an unmanned aerial vehicle (UAV) (known as a pilotless aircraft or a drone) are exclusively referred to as an unmanned aircraft system (UAS) or a remotely piloted aircraft system (RPAS).

The UAS includes UAV ground control equipment, a UAV, and a data link. The data link refers to a wireless data link between a ground radio station (GRS) and the UAV, and may be broadly classified into a UAS ground control and non-payload communication (CNPC) data link and a UAS data link for tasks.

A data link for tasks is a link used to transfer data associated with performing of tasks, and is generally wideband in comparison to a CNPC data link. The CNPC data link is a link used to transfer data associated with UAV flight control, UAS state monitoring, and CNPC link management, and includes a pilot/air traffic control (ATC) relay link and a UAS control link. The pilot/ATC relay link is a communication link used to relay voice and data between a pilot and an ATC through the UAV, and the UAS control link is a link used to transfer control information associated with navigation safety between the pilot and the UAV. The UAS control link may be classified into a telecommand (TC) link and a telemetry (TM) link. The TC link is an uplink used to transfer flight orbit control information, all of UAV system control information required for safe flight, and the like, from a pilot on the ground to the UAV. The TM link is a downlink used to transfer a location, altitude and speed of the UAV, UAS operation mode and state, navigation aid data, tracking associated with detection and avoidance, a weather radar, video information, and the like, from the UAV to the pilot on the ground.

As a frequency for the UAV ground CNPC data link, a C band from 5030 megahertz (MHz) to 5091 MHz is generally considered. The C band is distributed as a new exclusive band in the World Radio communication Conference, 2012 (WRC-12). In addition, a band, for example, an L band from 960 MHz to 1164 MHz, distributed for an aeronautical mobile service may be considered, and a standard of the L band is prepared so that the L band is available for an aeronautical mobile service in the WRC-12. In the C band, a frequency jamming effect with an existing system and a multipath delay spread are relatively small. On the contrary, a directional antenna needs to be used to secure a link margin and a Doppler effect of the C band is great by five times in comparison to that of the L band. A low frequency band, for example the L band, distributed for an aeronautical mobile service is excellent in a propagation characteristic in comparison to the C band. The L band has a relatively low propagation loss of about 14 decibels (dB) in comparison to the C band. However, since existing navigation systems, for example, distance measurement equipment (DME), automatic dependent surveillance-broadcast (ADS-B), a tactical air navigation system (TACAN), and the like, are being operated in the confusion, it is difficult to secure a frequency and a great multipath delay spread occurs. Thus, the secured C band may be considered as a basic link of ground CNPC and a low frequency band (for example, the L band, an ultra high frequency (UHF), and the like) may be expected to be used to increase an availability of the CNPC data link for navigation safety of a UAV. Of course, the C band and the low frequency band may be used in reverse or used independently.

Connection types of the ground CNPC data link may include a point-to-point (P2P) type and a point-to-multipoint (P2MP) type. In the P2P type, a single GRS and a single unmanned aircraft (UA) form a data link. The P2P type is generally considered in an existing UAS. In the P2MP type, a single GRS and a plurality of UAs form a data link. Generally, in the P2MP type, GRSs are connected over a network, to support a GRS handover. In both the P2P type and P2MP type, GRSs may be connected over a network, and accordingly it is possible to provide a seamless UAV control communication service or to construct a single GRS. In the P2P type, a single GRS is generally constructed, and in the P2MP type, a network-based GRS is expected to be constructed. A network-based P2MP type capable of simultaneously forming a communication link with a plurality of UAVs and also forming a national network is expected to be considered as a next generation CNPC data link. Technology associated with such a P2MP UAS CNPC system has not been actively proposed.

Also, a CNPC channel needs to be assigned to operate an existing P2P UAS CNPC system. In an existing scheme, a spectrum authority (referred to as an "SA") statically assigns a channel during a relatively long period of time, for example, generally, 1 year or longer, when registering a UAS CNPC system. Thus, it is difficult to utilize a channel that is assigned to a specific UAS CNPC system at another UAS CNPC system.

Accordingly, there is an absolute need to operate a UAV CNPC system to efficiently utilize communication frequency resources that may control a plurality of UAVs to efficiently operate in a limited frequency band exclusive for controlling UAVs, in order to stably operate UAVs and expand a demand for UAVs.

SUMMARY

An aspect of at least one example embodiment is to provide a technology of designing and operating an unmanned aerial vehicle (UAV) control communication system that may efficiently operate a plurality of UAVs in a limited frequency band for controlling UAVs in order to stably operate UAVs and expand a demand for UAVs. Also, dynamical channel assignment and management may be necessarily required so that a spectrum authority (hereinafter, referred to as an "SA") may dynamically assign a frequency only when a UAV control and non-payload communication (CNPC) system operates, may retrieve the frequency immediately after the operation of the UAV CNPC system is completed and may reuse the frequency in another UAV CNPC system, while managing all frequencies in real time. Here, the SA may not statically assign a specific frequency to a specific CNPC system. The UAV CNPC system may need to support the dynamical channel assignment and management.

Another aspect of at least one example embodiment is to provide a method of setting a dynamically assigned frequency for controlling a UAV to a CNPC system and performing an access, based on the above dynamical channel assignment and management. At least one example embodiment provides a method of setting a frequency assigned by an SA and performing an access between an airborne radio station and a ground station.

According to an aspect, there is provided a channel access method in a UAV CNPC system, including setting an uplink frequency and a downlink frequency to each of a ground station and an airborne radio station, and performing, by the ground station and the airborne radio station, an initial access using the uplink frequency or the downlink frequency.

The setting may include acquiring, by a ground control station (GCS), the uplink frequency and the downlink frequency from a spectrum authority (SA), and setting, by the GCS, the uplink frequency and the downlink frequency to each of the ground station and the airborne radio station.

The setting may include transmitting, by the GCS, the uplink frequency and the downlink frequency to the ground station and the airborne radio station, and setting, by the ground station and the airborne radio station, the uplink frequency and the downlink frequency.

The transmitting may include transmitting, by the GCS, an assigned frequency information message to the ground station and the airborne radio station. The assigned frequency information message may include the uplink frequency, the downlink frequency, an uplink data class, a downlink data class, and a UAV identification (ID).

The UAV ID may be acquired by performing scrambling on a cyclic redundancy check (CRC).

The setting may include measuring, by the airborne radio station, signal energy for all assignable center frequencies, selecting at least one center frequency corresponding to signal energy that is greater than or equal to a threshold, and setting, by the airborne radio station, the uplink frequency and the downlink frequency based on the at least one center frequency.

The measuring may include measuring, by the airborne radio station, the signal energy in a minimum bandwidth among assignable bandwidths for all the assignable center frequencies.

The setting of the uplink frequency and the downlink frequency based on the at least one center frequency may include arranging the at least one center frequency in a descending order of signal energy, verifying, by the airborne radio station, a UAV ID of an assigned frequency information message that is received for the at least one arranged center frequency, and setting, by the airborne radio station, the uplink frequency and the downlink frequency based on the assigned frequency information message when the UAV ID matches an ID of an actual UAV.

The setting may include notifying, by the SA, a CNPC network of the uplink frequency and the downlink frequency that are assigned to the airborne radio station, and setting, by the CNPC network, the uplink frequency and the downlink frequency to the ground station.

According to another aspect, there is provided a channel access method in a UAV CNPC system, including setting a time slot of an uplink and a downlink frequency to each of a ground station and an airborne radio station, and performing, by the ground station and the airborne radio station, an initial access using the time slot of the uplink or the downlink frequency.

The setting may include acquiring, by a GCS, the time slot of the uplink and the downlink frequency from an SA, and setting, by the GCS, the time slot of the uplink and the downlink frequency to each of the ground station and the airborne radio station.

The setting may include transmitting, by the GCS, the time slot of the uplink and the downlink frequency to the ground station and the airborne radio station, and setting, by the ground station and the airborne radio station, the time slot of the uplink and the downlink frequency.

The transmitting may include transmitting, by the GCS, an assigned frequency information message to the ground station and the airborne radio station. The assigned frequency information message may include an uplink frequency, an uplink bandwidth, an uplink data class, a position of the time slot of the uplink, the downlink frequency, a downlink data class, and a UAV ID.

The UAV ID may be acquired by performing scrambling on a CRC.

The setting may include measuring, by the airborne radio station, signal energy for all assignable center frequencies, selecting at least one center frequency corresponding to signal energy that is greater than or equal to a threshold, and setting, by the airborne radio station, the time slot of the uplink and the downlink frequency based on the at least one center frequency.

The measuring may include measuring, by the airborne radio station, the signal energy in a minimum bandwidth among assignable bandwidths for all the assignable center frequencies.

The setting of the time slot of the uplink and the downlink frequency based on the at least one center frequency may include arranging the at least one center frequency in a descending order of signal energy, verifying, by the airborne radio station, a UAV ID of an assigned frequency information message that is received for the at least one arranged center frequency, and setting, by the airborne radio station, the time slot of the uplink and the downlink frequency based on the assigned frequency information message when the UAV ID matches an ID of an actual UAV.

The setting may include notifying, by the SA, a CNPC network of the time slot of the uplink and the downlink frequency that are assigned to the airborne radio station, and setting, by the CNPC network, the time slot of the uplink and the downlink frequency to the ground station.

Additional aspects of example embodiments will be set forth in part in the description which follows and, in part, will be apparent from the description, or may be learned by practice of the disclosure.

BRIEF DESCRIPTION OF THE DRAWINGS

These and/or other aspects, features, and advantages of the invention will become apparent and more readily appreciated from the following description of example embodiments, taken in conjunction with the accompanying drawings of which.

DETAILED DESCRIPTION

Figure 1:
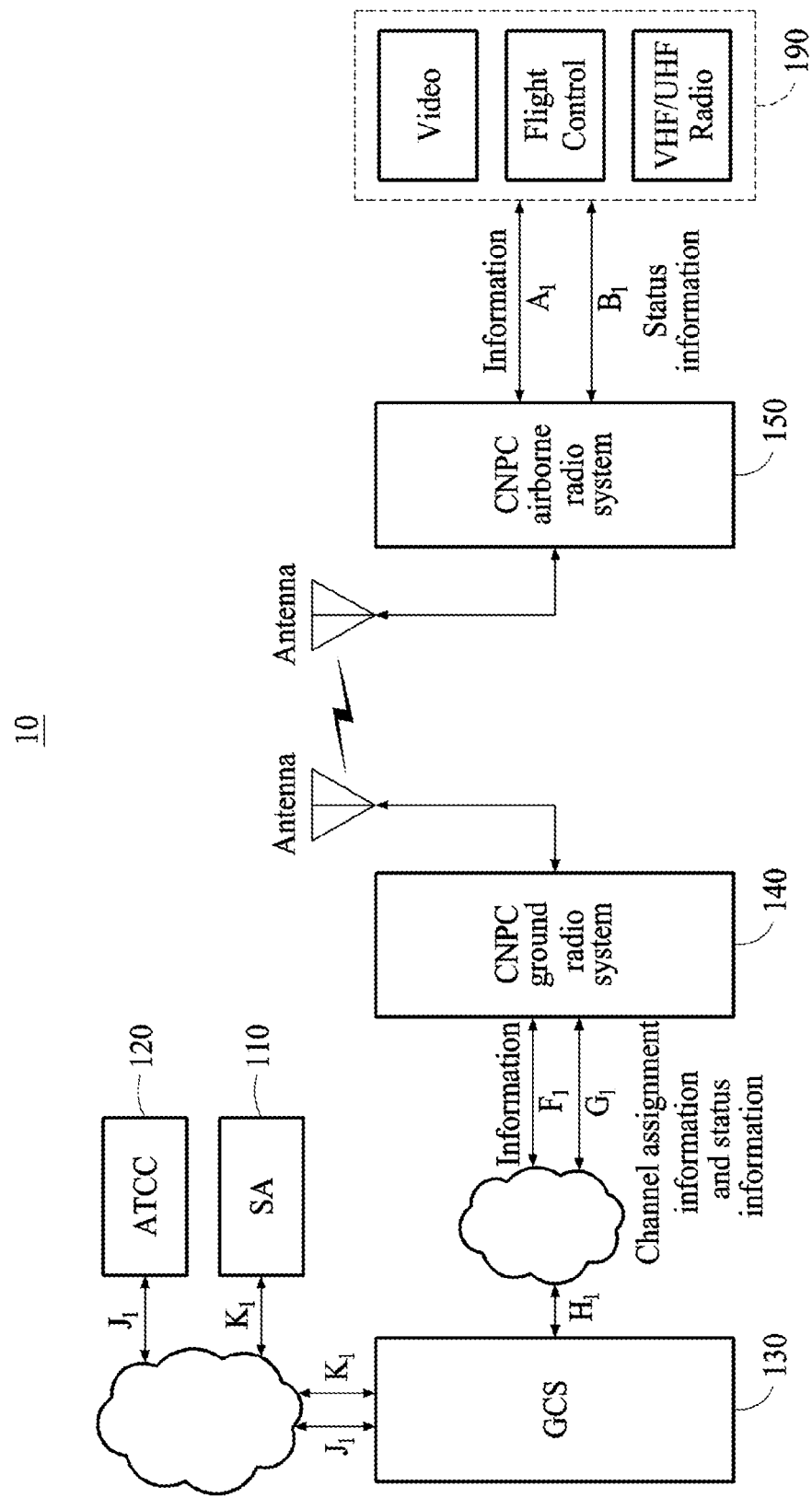
FIG. 1 is a diagram illustrating an example of information exchange and a relationship with neighboring systems for a stable operation of an unmanned aerial vehicle (UAV) in a UAV control and non-payload communication (CNPC) system according to an example embodiment.

The following structural or functional descriptions of example embodiments described herein are merely intended for the purpose of describing the example embodiments described herein and may be implemented in various forms. However, it should be understood that these example embodiments are not construed as limited to the illustrated forms.

Various modifications may be made to the example embodiments. Here, the examples are not construed as limited to the disclosure and should be understood to include all changes, equivalents, and replacements within the idea and the technical scope of the disclosure.

Although terms of "first," "second," and the like are used to explain various components, the components are not limited to such terms. These terms are used only to distinguish one component from another component. For example, a first component may be referred to as a second component, or similarly, the second component may be referred to as the first component within the scope of the present disclosure.

When it is mentioned that one component is "connected" or "accessed" to another component, it may be understood that the one component is directly connected or accessed to another component or that still other component is interposed between the two components. In addition, it should be noted that if it is described in the specification that one component is "directly connected" or "directly joined" to another component, still other component may not be present therebetween. Likewise, expressions, for example, "between" and "immediately between" and "adjacent to" and "immediately adjacent to" may also be construed as described in the foregoing.

The terminology used herein is for the purpose of describing particular embodiments only and is not intended to be limiting. As used herein, the singular forms are intended to include the plural forms as well, unless the context clearly indicates otherwise. It will be further understood that the terms "comprises" and/or "comprising," when used in this specification, specify the presence of stated features, integers, steps, operations, elements, components or a combination thereof, but do not preclude the presence or addition of one or more other features, integers, steps, operations, elements, components, and/or groups thereof.

Unless otherwise defined herein, all terms used herein including technical or scientific terms have the same meanings as those generally understood by one of ordinary skill in the art. Terms defined in dictionaries generally used should be construed to have meanings matching contextual meanings in the related art and are not to be construed as an ideal or excessively formal meaning unless otherwise defined herein.

Hereinafter, example embodiments will be described in detail with reference to the accompanying drawings. The scope of the right, however, should not be construed as limited to the example embodiments set forth herein. Like reference numerals in the drawings refer to like elements throughout the present disclosure.

FIG. 1 illustrates an example of information exchange and a relationship with neighboring systems for a stable operation of an unmanned aerial vehicle (UAV) in a UAV control and non-payload communication (CNPC) system 10 according to an example embodiment.

Referring to FIG. 1, the UAV CNPC system 10 may include a spectrum authority (hereinafter, referred to as an "SA") 110, an air traffic control center (ATCC) 120, a ground control station (GCS) 130, a CNPC ground radio system 140, and a CNPC airborne radio system 150.

The UAV CNPC system 10 may be a point-to-point (P2P) UAV CNPC system configured to control a UAV 190. The UAV 190 may include at least one of a video processor, a flight control processor or a very high frequency (VHF)/ultra high frequency (UHF) radio processor.

For an operation of the P2P UAV CNPC system, the GCS 130 may send a request for a channel to the SA 110 and the SA 110 may assign a channel to the GCS 130 in operation K1.

The GCS 130 may transmit ground/UAV CNPC radio channel assignment information and status information G1 and information F1 to the CNPC ground radio system 140 through a distribution system in operation H1. The information F1 may include UAV control data and communication data with the ATCC 120.

The CNPC ground radio system 140 may transfer information A1 to the flight control processor and VHF/UHF radio processor. The information A1 may include UAV control data and communication data with the ATCC 120, and accordingly may be substantially the same as the information F1. The UAV control data may include UAV telemetry and video data. Also, the CNPC ground radio system 140 may transfer CNPC airborne radio status information B1 to the flight control processor.

The CNPC airborne radio system 150 may transfer the information A1 to the CNPC ground radio system 140. The CNPC ground radio system 140 may transfer the information F1 received from the CNPC airborne radio system 150, the CNPC radio channel assignment information and status information G1 to the GCS 130 via a wired/wireless network in operation H1. A characteristic of the UAV CNPC system 10 will be described below.

Hereinafter, a link configuration for an operation of the UAV CNPC system 10 will be described.

1) The UAV CNPC system 10 may include a plurality of pairs of ground stations and airborne radio stations, and each of the ground stations and each of the airborne radio stations may form a one-to-one communication link.

2) When the UAV CNPC system 10 is a standalone system, the UAV CNPC system 10 may expand a coverage by a handover and control transfer of a ground radio station (GRS) of a GCS.

3) The UAV CNPC system 10 may implement a frequency-division multiple access (FDMA)-based ground station, to support a plurality of P2P UAVs in a single ground station.

Hereinafter, configurations for operations of an uplink channel and a downlink channel of the UAV CNPC system 10 will be described.

1) The UAV CNPC system 10 may operate through an FDMA channel in an uplink from a ground station to an airborne radio station and a downlink from the airborne radio station to the ground station.

2) The UAV CNPC system 10 may simultaneously support transmission (Tx) and reception (Rx) in a dual band channel (for example, an L band and a C band).

3) The UAV CNPC system 10 may support four data classes (DC1) with a plurality of channel bandwidths (for example, 30 kilohertz (kHz), 60 kHz, 90 kHz and 120 kHz).

4) The UAV CNPC system 10 may support different numbers of channel bandwidths for each link direction and for each band.

5) The UAV CNPC system 10 may support DC1, DC2 or DC3 in the uplink, and may support DC1, DC2, DC3, DC4, DC5 or DC6 in the downlink.

6) The airborne radio station of the UAV CNPC system 10 may support simultaneous transmissions of two FDMA channels. For example, the two FDMA channels may be a single channel for controlling a UAV among DC1 through DC4, and a single channel for safety video among DC5 and DC6.

7) The UAV CNPC system 10 may operate in a fixed channel except a channel reassignment and handover.

Figure 2:
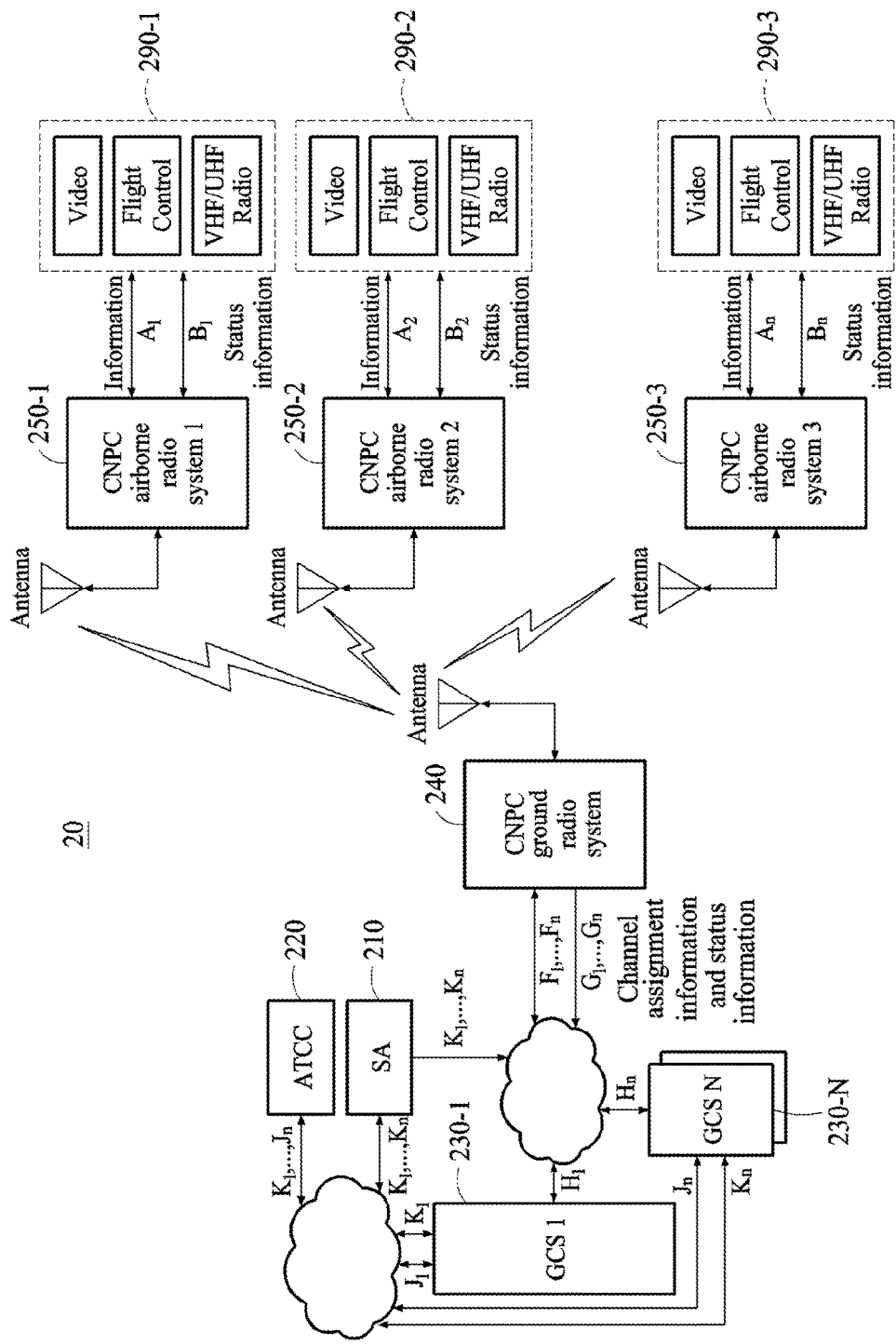
FIG. 2 is a diagram illustrating another example of information exchange and a relationship with neighboring systems for a stable operation of a UAV in a UAV CNPC system according to an example embodiment.

FIG. 2 illustrates another example of information exchange and a relationship with neighboring systems for a stable operation of a UAV in a UAV CNPC system 20 according to an example embodiment.

Referring to FIG. 2, the UAV CNPC system 20 may include a SA 210, an ATCC 220, GCSs 230-1 through 230-N, a CNPC ground radio system 240, and CNPC airborne radio systems 250-1 through 250-3. The UAV CNPC system 20 may be a point-to-multipoint (P2MP) UAV CNPC system configured to control UAVs 290-1 through 290-3. Each of the UAVs 290-1 through 290-3 may include at least one of a video processor, a flight control processor or a VHF/UHF radio processor.

Operations and configurations of the SA 210, the ATCC 220, the GCSs 230-1 through 230-N, the CNPC ground radio system 240, and the CNPC airborne radio systems 250-1 through 250-3 may be substantially the same as those of the SA 110, the ATCC 120, the GCS 130, the CNPC ground radio system 140, and the CNPC airborne radio system 150 of FIG. 1.

For convenience of description, three CNPC airborne radio systems, that is, the CNPC airborne radio systems 250-1 through 250-3 and three UAVs, that is, the UAVs 290-1 through 290-3 are shown in FIG. 2, however, there is no limitation thereto. For example, a plurality of CNPC airborne radio systems and a plurality of UAVs may be implemented.

For an operation of the P2MP UAV CNPC system, the GCSs 230-1 through 230-N may send a request for a channel to the SA 210, and the SA 210 may assign channels to the GCSs 230-1 through 230-N in operations K1 through Kn.

The GCSs 230-1 through 230-N may transmit information F1 that includes UAV control data and communication data with the ATCC 220 to the CNPC ground radio system 240 through a distribution system in operations H1 through Hn. The SA 210 may transmit UAV channel assignment information K1 through Kn to the CNPC ground radio system 240. The CNPC ground radio system 240 may transfer information A1 through An received from the GCSs 230-1 through 230-N to flight control processors and VHF/UHF radio processors of the UAVs 290-1 through 290-3 that are respectively controlled by the GCSs 230-1 through 230-N. The information A1 through An may include UAV control data and communication data with the ATCC 220, and accordingly may be substantially the same as the information F1 through Fn. The UAV control data may include UAV telemetry and video data. Also, the CNPC ground radio system 240 may transmit CNPC airborne radio status information B1 through Bn to the flight control processors.

The CNPC airborne radio systems 250-1 through 250-3 may relay the information A1 through An from the VHF/UHF radio processors to the CNPC ground radio system 240.

The CNPC ground radio system 240 may transfer CNPC radio channel assignment information and status information G1 through Gn and the information F1 through Fn received from the CNPC airborne radio systems 250-1 through 250-3 to the GCSs 230-1 through 230-N in operations H1 through Hn.

A communication service for safe navigation control between the GCSs 230-1 through 230-N and the UAVs 290-1 through 290-3 provided by the UAV CNPC system 20 may vary depending on an uplink or a downlink. In the uplink, the communication service may include at least one of telecommand information, ATC relay information or NavAid setting information. In the downlink, the communication service may include at least one of telemetry information, ATC relay information, NavAid information, DAA target information, weather radar information, safety takeoff landing video information or emergency video information. The ATC relay information may include ATC audio and data relay information.

The UAV CNPC system 20 may define and provide various service classes to provide various services based on a channel capacity. The channel capacity may be a CNPC channel capacity for the UAVs 290-1 through 290-3.

For example, in the uplink, the CNPC airborne radio systems 250-1 through 250-3 may provide various service classes based on an assigned channel bandwidth or channel capacity by defining service classes as shown in Table 1 below. Also, in the downlink, the CNPC airborne radio systems 250-1 through 250-3 may provide various service classes based on an assigned channel bandwidth or channel capacity by defining service classes as shown in Table 2 below.

TABLE 1

|  | Service Class 1 | Service Class 2 | Service Class 3 |
|---|---|---|---|
| Telecommand | ○ | ○ | ○ |
| ATC Relay |  | ○ | ○ |
| NavAid Setting |  |  | ○ |

TABLE 2

| | Service Class 1 | Service Class 2 | Service Class 3 | Service Class 4 | Service Class 5 | Service Class 6 |
|---|---|---|---|---|---|---|
| Telemetry | ○ | ○ | ○ | ○ | | |
| ATC Relay | | ○ | ○ | ○ | | |
| NavAid | | | ○ | ○ | | |
| DAA Target | | | ○ | ○ | | |
| Weather Radar | | | | ○ | | |
| Take-off landing video | | | | | ○ | |
| Emergency video | | | | | | ○ |

Services provided by the CNPC airborne radio systems 250-1 through 250-3 may necessarily include telecommand information (an uplink from a ground station to an airborne radio station) and telemetry information (a downlink from the airborne radio station to the ground station) in order to control the UAVs 290-1 through 290-3. In addition, based on a capacity of a GRS and a radio station included in a UAV and an assigned channel capacity or bandwidth, at least one of TC/TM data, ATC relay information, NavAid information, DAA target information, weather radar information or video information may be further included.

The CNPC airborne radio systems 250-1 through 250-3 may provide video services (for example, safe takeoff and landing video information and/or emergency video information) that may be considered for takeoff and landing and emergency, through a single band (for example, a C band for controlling a UAV) of a separate downlink channel. In other words, the CNPC airborne radio systems 250-1 through 250-3 may simultaneously transmit a single service class among service classes 1 through 4, and a single service class among service classes 5 and 6 for takeoff and landing or en-route emergency, through different channels in the C band.

The UAV CNPC system 20 may operate in a dual band to satisfy a link availability of 99.999%. For example, the CNPC airborne radio systems 250-1 through 250-3 may operate in a dual band of a C band and an L band assigned for control of a UAV. The UAV CNPC system 20 may transmit the same information or different information in the dual band. When the CNPC airborne radio systems 250-1 through 250-3 transmit the same information, a signal diversity gain between the C band and L band may be obtained in a physical layer. When the CNPC airborne radio systems 250-1 through 250-3 transmit different information, the SA 210 may assign different bandwidths to the C band and L band.

The C band may be a frequency band used exclusively for a UAV and a whole frequency band of 61 megahertz (MHz), and may be utilized for a UAV CNPC. For example, the CNPC airborne radio systems 250-1 through 250-3 may transmit, in the C band, at least one of TC/TM data, ATC relay information, DAA target information or weather radar information.

In the L band, an interference with another aeronautical radio device may occur. For example, the CNPC airborne radio systems 250-1 through 250-3 may transmit TC/TM data in the L band. A characteristic of the UAV CNPC system 20 will be described below.

Hereinafter, a link configuration for an operation of the UAV CNPC system 20 will be described.

1) The UAV CNPC system 20 may include a plurality of ground stations to simultaneously support a plurality of airborne radio stations.

2) When the UAV CNPC system 20 is connected over a network, the UAV CNPC system 20 may expand a coverage by a handover between ground stations.

3) The UAV CNPC system 20 may implement a time-division multiplexing (TDM)-based ground station, to support a plurality of airborne radio stations in a single ground station.

Hereinafter, configurations for operations of an uplink channel and a downlink channel of the UAV CNPC system 20 will be described.

1) The UAV CNPC system 20 may operate through a TDM channel in an uplink from a ground station to an airborne radio station.

2) The UAV CNPC system 20 may assign different TDM time slots for each airborne radio station, and may distinguish the airborne radio stations based on the TDM time slots.

3) The UAV CNPC system 20 may fix and assign a channel bandwidth (a number of TDM time slots) and a frequency of a ground station. When long-term updating is performed, the UAV CNPC system 20 may change the number of TDM time slots.

4) The UAV CNPC system 20 may flexibly change a position and a number of time slots assigned to an airborne radio station that communicates with a corresponding ground station, to simultaneously support a plurality of airborne radio stations and efficiently support a channel change in a cell.

5) The UAV CNPC system 20 may operation through an FDMA channel in a downlink from an airborne radio station to a ground station.

6) The UAV CNPC system 20 may support simultaneous Tx and Rx in a dual band channel (for example, an L band and a C band).

7) The UAV CNPC system 20 may support a plurality of channel bandwidths (for example, eight channel bandwidths including 90 kHz, 180 kHz, 270 kHz, 360 kHz, 450 kHz, 540 kHz, 630 kHz and 720 kHz).

8) The UAV CNPC system 20 may support a number of TDM time slots determined based on an uplink channel bandwidth. For example, the UAV CNPC system 20 may support three time slots for 90 kHz, support six time slots for 180 kHz, and support 24 time slots for 720 kHz.

9) The UAV CNPC system 20 may support different numbers of channel bandwidths for each link direction and for each band. For example, the UAV CNPC system 20 may support 90 kHz, 180 kHz, 270 kHz, 360 kHz, 450 kHz, 540 kHz, 630 kHz and 720 kHz in the uplink, and support 30 kHz, 40 kHz, 90 kHz and 120 kHz in the downlink.

10) An airborne radio station of the UAV CNPC system 20 may support simultaneous transmissions of two FDMA channels. For example, the two FDMA channels may be a single channel for controlling a UAV among DC1 through DC4, and a single channel for safety video among DC5 and DC6.

11) The UAV CNPC system 20 may operate in a fixed channel except a channel reassignment and handover.

Hereinafter, an initial access method of the UAV CNPC system 10 or 20 will be described.

Figure 3:
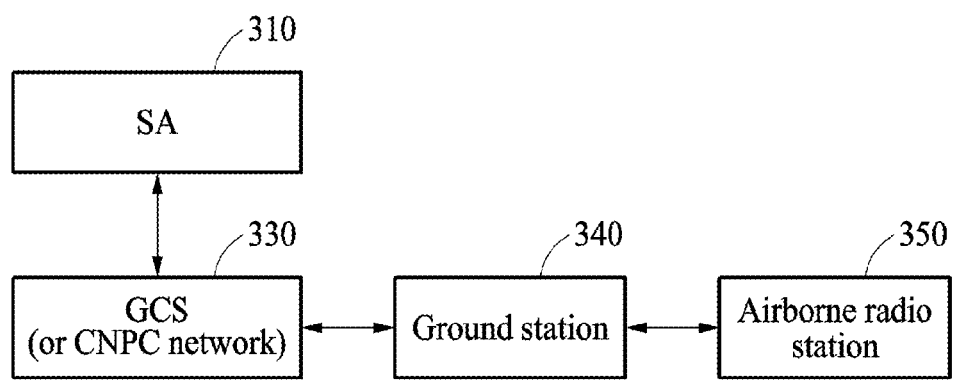
FIG. 3 is a block diagram illustrating an example of a UAV CNPC system according to an example embodiment.
Figure 4:
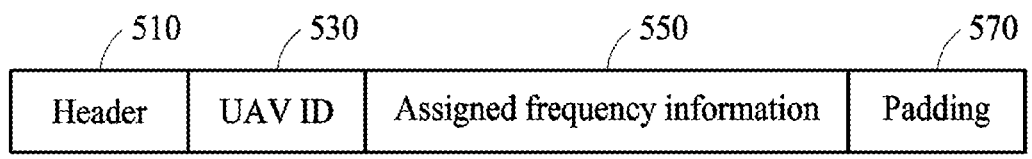
FIG. 4 is a diagram illustrating an example of assigned frequency information according to an example embodiment.
Figure 5:
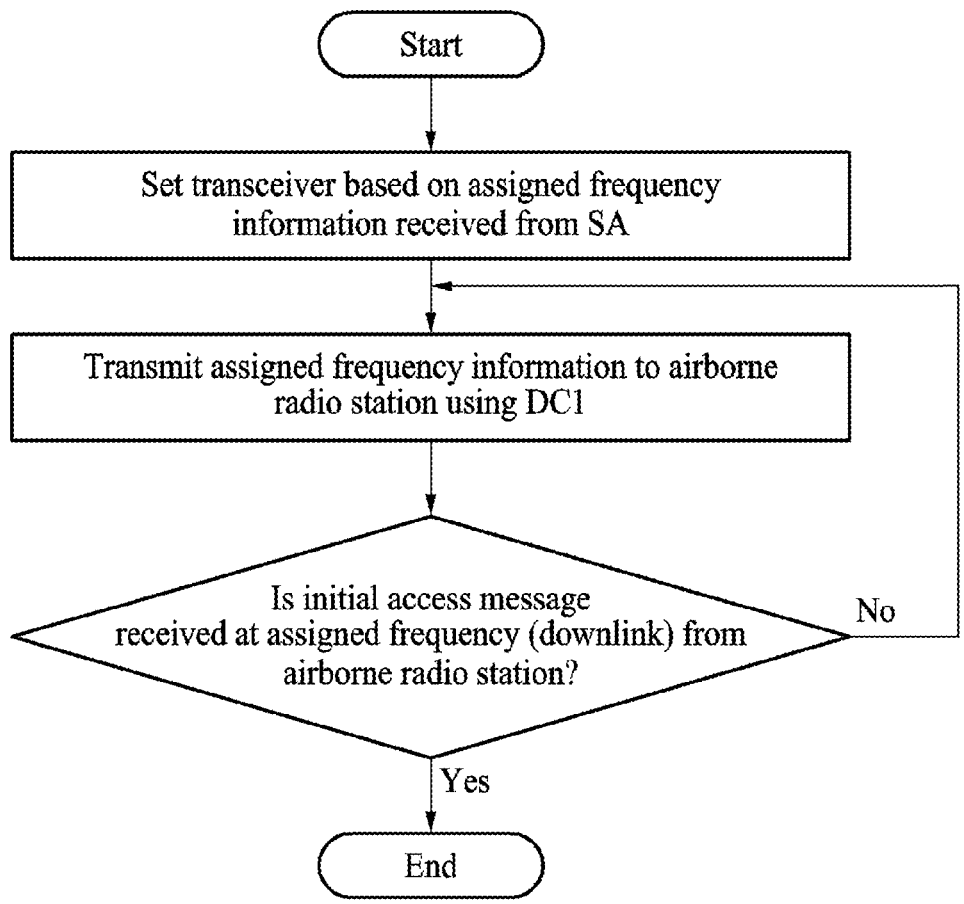
FIG. 5 is a flowchart illustrating an example in which a ground station of FIG. 3 transmits assigned frequency information.

FIG. 3 is a block diagram illustrating a UAV CNPC system 30 according to an example embodiment, FIG. 4 is a diagram illustrating an example of assigned frequency information according to an example embodiment, and FIG. 5 is a flowchart illustrating an example in which a ground station 340 of FIG. 3 transmits assigned frequency information.

Referring to FIGS. 3 through 5, the UAV CNPC system 30 may include an SA 310, a GCS 330, the ground station 340 and an airborne radio station 350.

The GCS 330 may receive an assigned frequency from the SA 310, and may set the frequency to the ground station 340 and the airborne radio station 350. The GCS 330 and the ground station 340 may be connected to each other directly or via a wired and wireless network. The GCS 330 may directly set a frequency of the ground station 340. The GCS 330 may set a frequency of the airborne radio station 350 using a scheme supported by the airborne radio station 350 (for example, a touch pad input, wireless settings via a Bluetooth connection, and the like). Also, the GCS 330 may set the frequency of the airborne radio station 350 based on information received through the ground station 340 using a predetermined scheme.

The ground station 340 may verify and set a frequency of a transceiver and data class (DC) based on information assigned by the SA 310. Here, when a DC of an uplink is not a DC1, the ground station 340 may set the DC of the uplink to the DC1 and may transmit an assigned frequency information message 500 using the DC1. The ground station 340 may transmit the assigned frequency information message 500 using the DC1 at an uplink frequency at each Tx timing. The ground station 340 may transmit the assigned frequency information message 500 to the airborne radio station 350 using the DC1. To this end, the ground station 340 may set a control frequency to the airborne radio station 350. When the UAV CNPC system 30 is of a P2MP type, the ground station 340 may transmit frequency information to a time slot assigned at the uplink frequency.

The ground station 340 may attempt to receive a message from the airborne radio station 350 at each Rx timing. For example, the ground station 340 may receive a message of the airborne radio station 350 at the assigned frequency using an assigned DC. When the message of the airborne radio station 350 is received, the ground station 340 may terminate a process of transmitting the assigned frequency information message 500. When the message of the airborne radio station 350 is not received, the ground station 340 may transmit the assigned frequency information message 500 and may repeatedly attempt to receive the message from the airborne radio station 350 until the ground station 340 receives the message.

The assigned frequency information message 500 may include a header 510, a UAV identification (ID) 530, assigned frequency information 550 and padding 570. The header 510 may include basic information, for example, a length of the assigned frequency information message 500. The UAV ID 530 may be an ID of a UAV that is a target of assigned frequency information. The ground station 340 may acquire the UAV ID 530 by performing scrambling on a cyclic redundancy check (CRC) added in a physical layer, and may transmit the UAV ID 530 to the airborne radio station 350. The assigned frequency information 550 may be information of frequencies assigned to the ground station 340 and the airborne radio station 350 for a control communication. The padding 570 may be information used to adjust a size of the assigned frequency information message 500. For example, to transmit the assigned frequency information message 500 using the DC1, the ground station 340 may set the size of the assigned frequency information message 500 to correspond to the DC1. In this example, the ground station 340 may control a size of the padding 570, to control the size of the assigned frequency information message 500.

Figure 6:
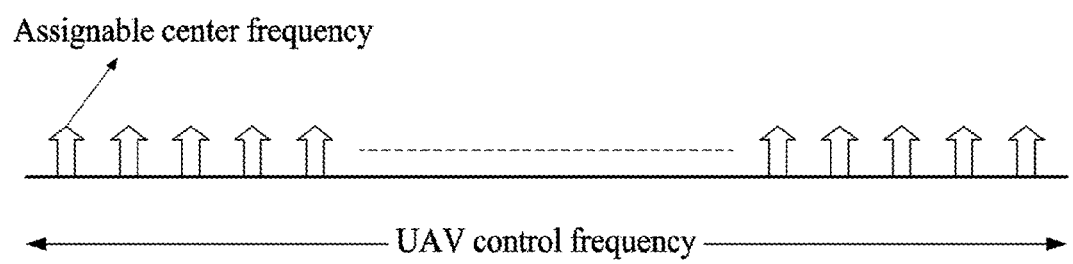
FIG. 6 is a diagram illustrating an assignable center frequency in a UAV control frequency according to an example embodiment.
Figure 7:
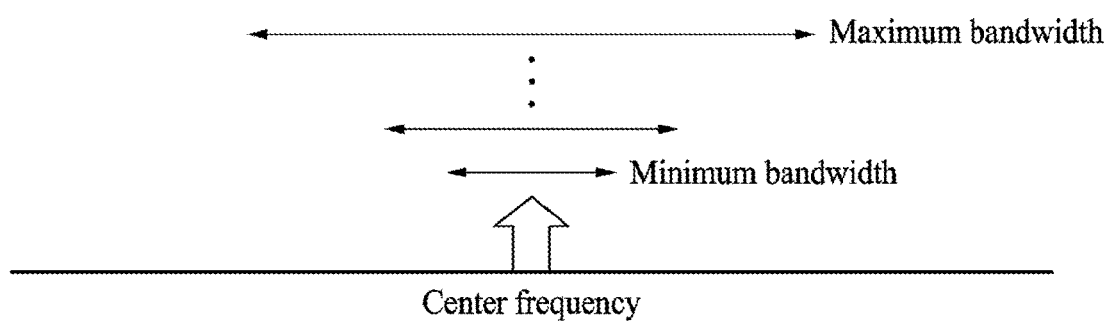
FIG. 7 is a diagram illustrating a size of an assignable bandwidth in a UAV control center frequency according to an example embodiment.

FIG. 6 illustrates an assignable center frequency in a UAV control frequency according to an example embodiment, and FIG. 7 illustrates a size of an assignable bandwidth in a UAV control center frequency according to an example embodiment.

Referring to FIGS. 3 to 7, when the ground station 340 transmits the assigned frequency information message 500, the airborne radio station 350 may need to receive the assigned frequency information message 500. In other words, the airborne radio station 350 may need to verify a frequency at which the ground station 340 transmits the assigned frequency information message 500.

The airborne radio station 350 may verify all assignable center frequencies in an assigned band of UAV control frequencies. When a frequency domain for the ground station 340 is individually set among UAV control frequencies, or when frequency bands are classified based on usage, the airborne radio station 350 may verify a center frequency in only a frequency band that may be used by the ground station 340.

Also, the airborne radio station 350 may verify all bandwidths for a single center frequency, because different bandwidths may be assigned at a single center frequency. The airborne radio station 350 may measure signal energy (for example, a radio signal strength) at a minimum bandwidth for all the assignable center frequencies.

Here, the airborne radio station 350 may search for at least one center frequency corresponding to measured signal energy that is greater than or equal to a threshold, and may arrange the at least one center frequency in a descending order of signal energy values. The airborne radio station 350 may attempt to receive a DC1 signal in an order of central frequencies arranged in the descending order of signal energy values. For example, the airborne radio station 350 may attempt to receive a DC1 signal with respect to all applicable bandwidths of a center frequency with a highest signal energy value.

When the airborne radio station 350 receives a message with a UAV ID that matches the UAV ID 530, the airborne radio station 350 may terminate a search process (or a verification process). When the message with the UAV ID that matches the UAV ID 530 is not received, the airborne radio station 350 may attempt to receive a DC1 signal at a center frequency with a next highest signal energy value. Through the above-described process, the airborne radio station 350 may reduce a time to search for (or verify) a center frequency.

When the UAV CNPC system 30 is of the P2MP type, the airborne radio station 350 may attempt to receive a signal with respect to all time slots that are based on a bandwidth size, because a number of time slots may vary depending on the bandwidth size.

Figure 8:
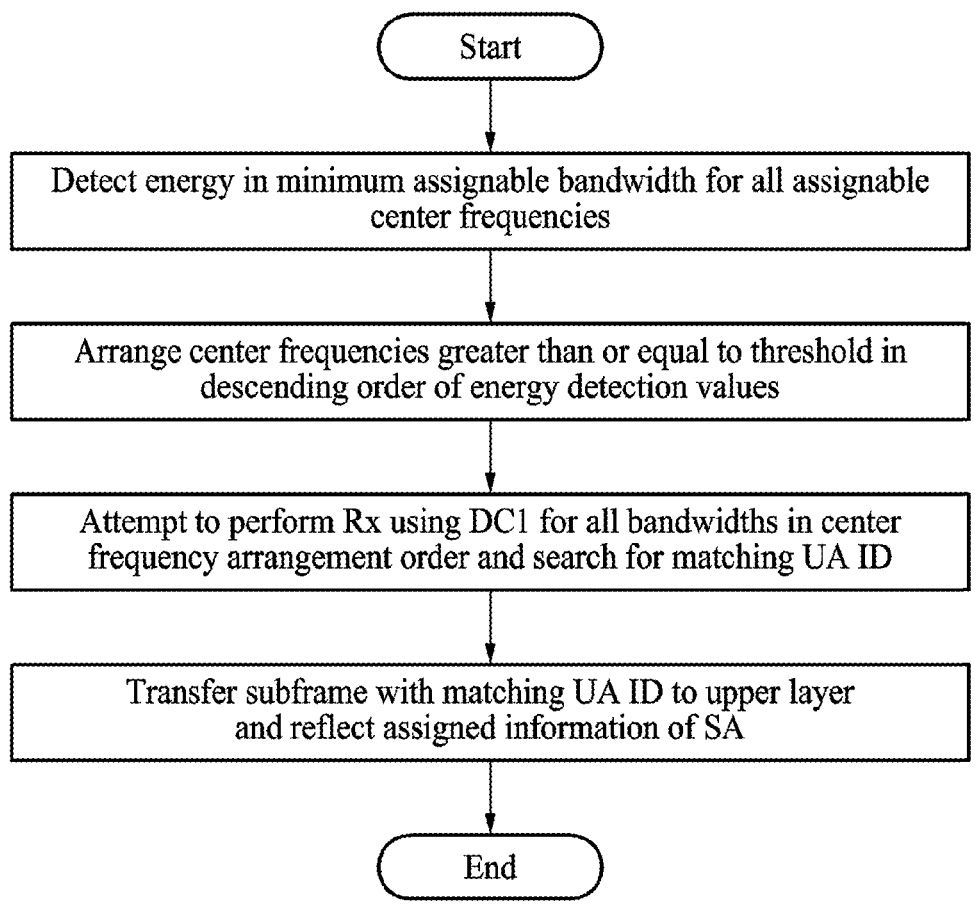
FIG. 8 is a flowchart illustrating an example in which an airborne radio station of FIG. 3 acquires assigned frequency information.

FIG. 8 illustrates an example in which the airborne radio station 350 of FIG. 3 acquires assigned frequency information.

Referring to FIGS. 3 and 8, the airborne radio station 350 may acquire the assigned frequency information 550 transmitted by the ground station 340. The airborne radio station 350 may measure signal energy in a minimum bandwidth among assignable bandwidths for all assignable center frequencies. The airborne radio station 350 may search for at least one center frequency corresponding to measured signal energy that is greater than or equal to a threshold, and may arrange the at least one center frequency in a descending order of signal energy values. The airborne radio station 350 may attempt to receive a DC1 signal in an arrangement order of the at least one center frequency. Similarly to the above description, the airborne radio station 350 may attempt to receive a DC1 signal with respect to all assignable bandwidths for each center frequency.

When the UAV CNPC system 30 is of the P2MP type, the airborne radio station 350 may attempt to receive a DC1 signal with respect to all time slots that are based on a bandwidth size. When the airborne radio station 350 succeeds in attempting to receive the DC1 signal and when the UAV ID 530 of the received assigned frequency information message 500 matches a UAV ID assigned to the airborne radio station 350, the airborne radio station 350 may transfer the assigned frequency information message 500 to an upper layer. Accordingly, the assigned frequency information 550 of the SA 310 may be reflected. The airborne radio station 350 may terminate a process of acquiring the assigned frequency information.

When a CNPC network is installed at an initial operation, a frequency to be used may be assigned to the ground station 340. When a UAV is utilized by the GCS 330, the GCS 330 may receive, from the SA 310, a frequency that may be used by a UAV in a downlink and a frequency that may be used by the ground station 340 in an uplink. When the CNPC network is installed and utilized, the GCS 330 may not directly set information to the ground station 340 and the SA 310 may directly notify the CNPC network of corresponding information. The airborne radio station 350 may use a scheme supported by the airborne radio station 350 and a scheme of using information received through the ground station 340, similarly to when the CNPC network is absent. In other words, the CNPC network and the GCS 330 may perform substantially similar operations.

The CNPC network may be a communication network formed between the GCS 330 and the ground station 340. For example, the CNPC network may perform an initial access operation based on identities of the GCS 330 and the ground station 340.

The above-described configurations may perform an initial access between the ground station 340 and the airborne radio station 350 based on a frequency assigned by the SA 310. Also, a UAV may search for an assigned frequency and perform an access even though the UAV does not know assigned frequency information. The above-described UAV CNPC system may be flexibly expanded, and may be used for a P2P type or P2MP type. For example, when the UAV CNPC system is of the P2MP type, a plurality of UAVs may be simultaneously supported.

The components described in the example embodiments may be implemented by hardware components including, for example, at least one digital signal processor (DSP), a processor, a controller, an application-specific integrated circuit (ASIC), a programmable logic element, such as a field programmable gate array (FPGA), other electronic devices, or combinations thereof. At least some of the functions or the processes described in the example embodiments may be implemented by software, and the software may be recorded on a recording medium. The components, the functions, and the processes described in the example embodiments may be implemented by a combination of hardware and software.

The systems, and other components described herein may be implemented using a hardware component, a software component and/or a combination thereof. A processing device may be implemented using one or more general-purpose or special purpose computers, such as, for example, a processor, a controller and an arithmetic logic unit (ALU), a DSP, a microcomputer, an FPGA, a programmable logic unit (PLU), a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such a parallel processors.

The software may include a computer program, a piece of code, an instruction, or some combination thereof, to independently or collectively instruct or configure the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more non-transitory computer readable recording mediums.

The methods according to the above-described example embodiments may be recorded in non-transitory computer-readable media including program instructions to implement various operations of the above-described example embodiments. The media may also include, alone or in combination with the program instructions, data files, data structures, and the like. The program instructions recorded on the media may be those specially designed and constructed for the purposes of example embodiments, or they may be of the kind well-known and available to those having skill in the computer software arts. Examples of non-transitory computer-readable media include magnetic media such as hard disks, floppy disks, and magnetic tape; optical media such as CD-ROM discs, DVDs, and/or Blue-ray discs; magneto-optical media such as optical discs; and hardware devices that are specially configured to store and perform program instructions, such as read-only memory (ROM), random access memory (RAM), flash memory (e.g., USB flash drives, memory cards, memory sticks, etc.), and the like. Examples of program instructions include both machine code, such as produced by a compiler, and files containing higher level code that may be executed by the computer using an interpreter. The above-described devices may be configured to act as one or more software modules in order to perform the operations of the above-described example embodiments, or vice versa.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A channel access method in an unmanned aerial vehicle (UAV) control and non-payload communication (CNPC) system, the channel access method comprising:
setting an uplink frequency and a downlink frequency to each of a ground station and an airborne radio station; and
performing, by the ground station and the airborne radio station, an initial access using the uplink frequency or the downlink frequency,
wherein the setting comprises:
measuring, by the airborne radio station, signal energy for all assignable center frequencies;
selecting at least one center frequency corresponding to signal energy that is greater than or equal to a threshold; and
setting, by the airborne radio station, the uplink frequency and the downlink frequency based on the at least one center frequency.

2. The channel access method of claim 1, wherein the setting comprises:
acquiring, by a ground control station (GCS), the uplink frequency and the downlink frequency from a spectrum authority (SA); and
setting, by the GCS, the uplink frequency and the downlink frequency to each of the ground station and the airborne radio station.

3. The channel access method of claim 1, wherein the setting comprises:
transmitting, by the GCS, the uplink frequency and the downlink frequency to the ground station and the airborne radio station; and
setting, by the ground station and the airborne radio station, the uplink frequency and the downlink frequency.

4. The channel access method of claim 3, wherein
the transmitting comprises transmitting, by the GCS, an assigned frequency information message to the ground station and the airborne radio station, and
the assigned frequency information message comprises the uplink frequency, the downlink frequency, an uplink data class, a downlink data class, and a UAV identification (ID).

5. The channel access method of claim 4, wherein the UAV ID is acquired by performing scrambling on a cyclic redundancy check (CRC).

6. The channel access method of claim 1, wherein the measuring comprises measuring, by the airborne radio station, the signal energy in a minimum bandwidth among assignable bandwidths for all the assignable center frequencies.

7. The channel access method of claim 1, wherein the setting of the uplink frequency and the downlink frequency based on the at least one center frequency comprises:
arranging the at least one center frequency in a descending order of signal energy;
verifying, by the airborne radio station, a UAV ID of an assigned frequency information message that is received for the at least one arranged center frequency; and
setting, by the airborne radio station, the uplink frequency and the downlink frequency based on the assigned frequency information message when the UAV ID matches an ID of an actual UAV.

8. The channel access method of claim 1, wherein the setting comprises:
notifying, by the SA, a CNPC network of the uplink frequency and the downlink frequency that are assigned to the airborne radio station; and
setting, by the CNPC network, the uplink frequency and the downlink frequency to the ground station.

9. A channel access method in an unmanned aerial vehicle (UAV) control and non-payload communication (CNPC) system, the channel access method comprising:
setting a time slot of an uplink and a downlink frequency to each of a ground station and an airborne radio station; and
performing, by the ground station and the airborne radio station, an initial access using the time slot of the uplink or the downlink frequency,
wherein the setting comprises:
measuring, by the airborne radio station, signal energy for all assignable center frequencies;
selecting at least one center frequency corresponding to signal energy that is greater than or equal to a threshold; and
setting, by the airborne radio station, the uplink frequency and the downlink frequency based on the at least one center frequency.

10. The channel access method of claim 9, wherein the setting comprises:
acquiring, by a ground control station (GCS), the time slot of the uplink and the downlink frequency from a spectrum authority (SA); and
setting, by the GCS, the time slot of the uplink and the downlink frequency to each of the ground station and the airborne radio station.

11. The channel access method of claim 10, wherein the setting, by the GCS, the time slot of the uplink and the downlink frequency to each of the ground station and the airborne radio station comprises:
transmitting, by the GCS, the time slot of the uplink and the downlink frequency to the ground station and the airborne radio station; and
setting, by the ground station and the airborne radio station, the time slot of the uplink and the downlink frequency.

12. The channel access method of claim 11, wherein
the transmitting comprises transmitting, by the GCS, an assigned frequency information message to the ground station and the airborne radio station, and
the assigned frequency information message comprises an uplink frequency, an uplink bandwidth, an uplink data class, a position of the time slot of the uplink, the downlink frequency, a downlink data class, and a UAV identification (ID).

13. The channel access method of claim 12, wherein the UAV ID is acquired by performing scrambling on a cyclic redundancy check (CRC).

14. The channel access method of claim 9, wherein the measuring comprises measuring, by the airborne radio station, the signal energy in a minimum bandwidth among assignable bandwidths for all the assignable center frequencies.

15. The channel access method of claim 9, wherein the setting of the time slot of the uplink and the downlink frequency based on the at least one center frequency comprises:
arranging the at least one center frequency in a descending order of signal energy;

verifying, by the airborne radio station, a UAV ID of an assigned frequency information message that is received for the at least one arranged center frequency; and setting, by the airborne radio station, the time slot of the uplink and the downlink frequency based on the assigned frequency information message when the UAV ID matches an ID of an actual UAV.

16. The channel access method of claim 9, wherein the setting comprises:

notifying, by a spectrum authority (SA), a CNPC network of the time slot of the uplink and the downlink frequency that are assigned to the airborne radio station; and setting, by the CNPC network, the time slot of the uplink and the downlink frequency to the ground station.

* * * * *